July 1, 1941.  F. C. ELLIS  2,247,875
DIAGNOSTIC METHOD
Filed Aug. 18, 1936
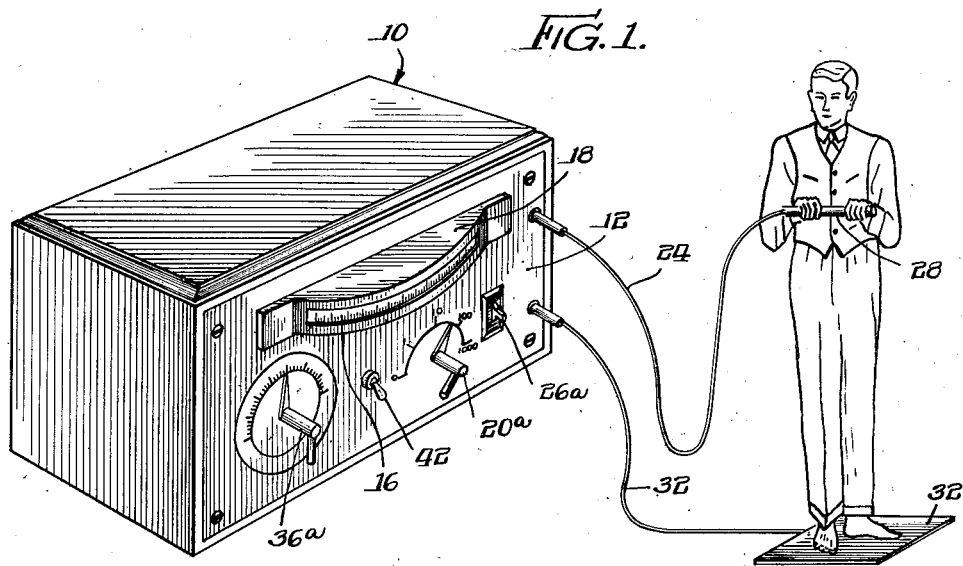
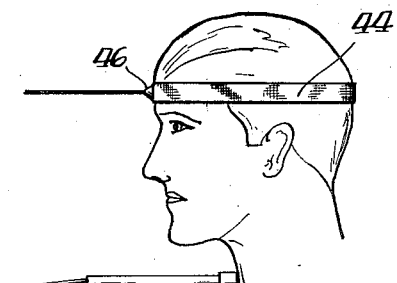
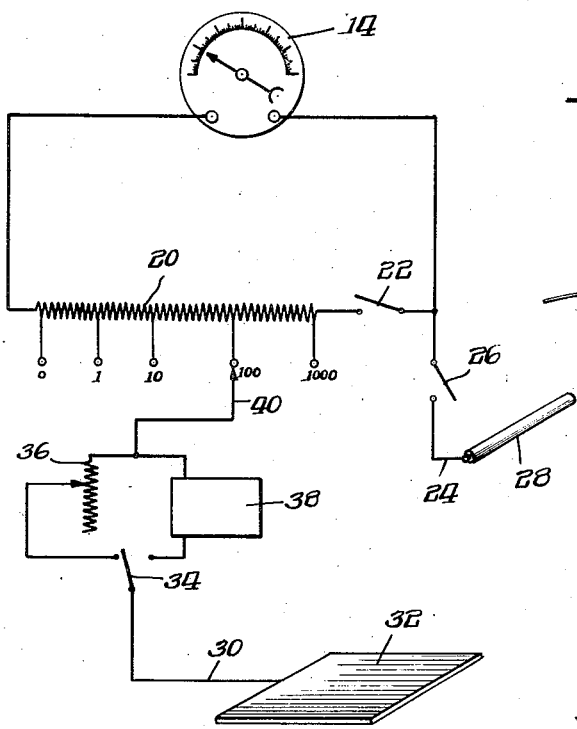
Inventor:—
Francis C. Ellis
By:— Cox & Moore
attys.

Patented July 1, 1941

2,247,875

UNITED STATES PATENT OFFICE 2,247,875

DIAGNOSTIC METHOD

Francis C. Ellis, Chicago, Ill.

Application August 18, 1936, Serial No. 96,589

5 Claims. (Cl. 128—2.1)

My invention relates to diagnostic methods, and more particularly to a process for measuring the electrolytic property of the human body.

A medical practitioner, in diagnosing an ailment, collects all the available symptoms, and, on the basis of these facts, draws conclusions as to the nature of the affliction. The human body when in normal healthy state may be deemed to have properties which characterize its state. For instance, in normal conditions of health, the temperature of the body is constant for most all individuals. Similarly, blood pressure measurements occur within a certain range, if the human system is functioning properly. Thus the physiological characteristics of an organism are known to be affected pathologically by disease, injury, or any abnormal deterioration thereof, and it is, of course, desirable to be able to recognize such symptoms in measurable quantities. It is, therefore, the prime purpose of my invention to provide a new diagnostic adjunct.

It is a further purpose of my invention to provide a process for measuring the electrolytic property of an organism.

It is a still further object of my invention to provide a method whereby changes in the electrolytic characteristics of an organism may be detected in a quick and simple manner and accurately measured.

It is another purpose of my invention to provide for the localized detection of areas in an organism having varying electrolytic properties.

It is yet another object of my invention to provide for the detection of abnormalities in animal organisms by comparison of its electrolytic properties with those of known normal organisms.

A yet further object of my invention is to provide a method of diagnosis wherein the human body is employed as an electrolyte or cell causing a current to flow in a current measuring circuit, the measured intensities of these currents bearing relationship to the pathologic condition of the patient.

A still further object of my invention is to measure the effects of therapeutic agents in observing the currents generated by the organism immediately before and after administration of the different treatments for the purpose of assisting in prescribing.

In addition to the foregoing objects and advantages, my invention contemplates the provision of a suitable measuring unit equipped with suitable instruments for sensitively measuring minute currents and for enabling the accomplishment of the above purposes.

The foregoing and numerous other objects and advantages will be apparent from the following detailed description of the invention and the devices employed therein as disclosed in illustrated embodiments in the drawing, wherein—

Figure 1 discloses a compact, portable measuring apparatus which represents one embodiment of my invention, the same being shown in operative association with a patient to more clearly illustrate the practical application thereof;

Figure 2 is a circuit diagram illustrating the manner in which current readings may be made in practicing my improved method of electrical diagnosis; and Figure 3 discloses a modified electrode arrangement in which one electrode is secured in position upon the patient's forehead, and the other is free to be applied to the body at various locations.

It has been known for a considerable length of time that, when two dissimilar metallic electrodes are immersed in a bath containing an electrolyte, a difference in electrical potential exists therebetween. For instance, if zinc and copper electrodes having terminals are immersed in a solution of sulphuric acid and the terminals are connected by a conductor, an electrical current will flow in the conductor. At the same time the zinc electrode will gradually decompose into zinc sulphate, while at the copper electrode hydrogen gas will be liberated. In other words, due to the varying proporties of the two metals in the electrolyte, an ionic migration takes place causing a difference between the electrical potential of the electrodes.

I have discovered that, when an organism such as the human body is contacted at two different points by such dissimilar metals, a potential difference will likewise be set up between the terminals thereon. Thus, in the results attained, this effect is highly analogous to the well-known electrolytic cell for producing electric current. The exact nature and physical explanation of the results produced are not fully known, but since the human organism forms the connection between the electrodes in the same general relationship as the electrolyte in the electric cell, and since a difference in electrical potential results in the same manner, it appears that the organism acts in the manner of an electrolyte. For this reason the potential difference measured across the terminals of the electrodes will serve as an indication of the electrolytic properties of the body.

Thus my invention contemplates a method in which electrodes, or terminals, of different metals are applied to an organism at different points thereon and the current flow measured by a sensitive instrument such as a galvanometer when the electrical circuit is completed between them.

The current flow is caused solely by the difference in potential resulting from the organization consisting of two dissimilar electrodes and the intermediate organism. When a galvanometer is employed as the current indicating instrument, therefore, the galvanometer deflection results from the continuous direct current generated in this manner. The degree of deflection as indicated upon the galvanometer scale thus bears a definite relationship to the electrolytic condition of the body.

I have further found from numerous tests upon athletes and persons indicated by medical examination and known to be in perfect health, that the galvanometer deflection caused by the use as above will fall within a certain range. I have found when a human patient stands barefooted upon one of the electrodes and holds the other in his hands, for instance, that patients suffering from diseases or bodily disorders would in general cause greater or less galvanometer deflections than normal or healthy persons. Moreover, these deflections may occur in a degree depending upon the general type and virulence of disease condition. In other words, the electrolytic properties of the organism vary under the influence of many disease conditions according to certain effects produced on the body by the incidence of the disease.

Persons with disease characteristics cause a much different deflection or variation than persons not so afflicted. In other words, I have found that pathologic conditions give rise to readings on my instrument varying from the normal, thereby enabling accurate comparisons to be made as an aid to diagnosis. I have found that galvanometer deflections referred to above remain quite constant and characteristic of individual patients over a period of time, unless something happens in the meantime to alter their electrolytic condition, such as an illness or some therapeutic measure. So, too, just as body temperature or blood pressure may vary in the individual according to various influences, I have found that the electrolytic condition of the body may change in accordance with such conditions as fatigue, stimulants, sedatives, etc. That is to say, the electrical characteristics of an individual normally remain substantially constant, so that, by making comparative tests from time to time, and noting differences in the throw of the galvanometer, the practitioner is able to detect variations in pathologic condition of the patient.

I have discovered, however, that a current flow will be produced only if the animal organism is living. Tests carried out on corpses have shown that no noticeable galvanometer deflection occurs. And experiments on chickens show that the decline in galvanometer reading after death is quite rapid. Therefore, it is obvious that the results of my method are founded upon actual life processes and that a galvanometer reading indicates a property of living matter.

My invention also contemplates a method of diagnosis which consists in making the above mentioned electrical tests after the patient has been subjected to various treatments, in order to determine the effect, if any, such treatments had upon the body. For example, a test as described above may first be conducted, and subsequently the patient given an injection or measured quantity of medicine internally. At predetermined intervals following the medical treatment, the electrical tests are made in order to draw a comparison with the galvanometer readings previously obtained. Also, the patient may be given an electric treatment, which consists in passing minute currents through the body. After this is done, my method of electrical diagnosis may be made to determine the effect of such treatments. In other words, my invention contemplates the provision of an apparatus and method, whereby a plurality of tests as described above may be made for comparative purposes, and from these comparative results definite conclusions are drawn as to the existence or non-existence, degree, nature, etc., of the disease. In addition to using the instrument for studying the effects of drugs and electrical currents, it may also be used to study the effects of diet, fasting, hypnotism, or any other influence affecting the human organism, including treatment by radiant energies, etc. The use of the instrument is also important in connection with the study of changes which take place in a patient connected to other electrical circuits during the making of my test, and under these conditions the body currents are controlled or altered by various electrical tuning or other mechanical devices.

Morevore, I have discovered that in the case of localized affections caused, for instance, by physical injury or by localized disease conditions, while the current flow may occur in the normal range when the electrodes are applied to other parts of the body, if one of them is contacted in the neighborhood of the affected area an abnormal reading will occur. Thus I may readily detect many sites of increased pathological activity.

I may carry out my invention by the employment of various instruments. However, in the drawing I have illustrated a particular embodiment which I shall completely describe for illustrative purposes.

It will be seen that an apparatus representing one means whereby my improved method of electrical diagnosis may be practiced, includes a portable unit designated generally by the numeral 10 in Figure 1. In the disclosed embodiment this unit includes a boxlike casing or housing 12, which encloses electrical equipment, certain portions of which are disclosed on the face of the instrument casing, and the remaining or enclosed portions are shown diagrammatically in Figure 2.

From the circuit diagram in Figure 2 it will be seen that I employ a galvanometer 14 or other suitable sensitive instrument for indicating minute currents. In the preferred embodiment of my portable unit I employ a deflecting type galvanometer, and in Figure 1 a translucent, graduated millimeter scale 16, upon which the galvanometer deflections are indicated, is shown as being housed within a suitable casing 18. Across the terminals of the galvanometer 14, I connect a conventional shunt 20, and provide a switch 22 to connect and disconnect said shunt with respect to the galvanometer. A conductor 24 connects with the switch 22 through a switch 26, and this conductor 24 is connectable with a suitable electrode 28. In Figure 1 the conductor 24 is shown as a flexible cord, and the electrode 28 is operatively associated with the hands of the user. A second conductor or cord 30 serves to connect electrically an electrode 32 in the galvanometer circuit through a switch 34 which connects to either an adjustable resistance 36 or a direct current amplifier 38. These devices are connectable with the shunt 20 through an adjustable contact element 40. In Figure 1 the manually rotatable element 36a controls the adjustable resistance 36 shown diagrammatically in Figure 2, while the manually shiftable or rotary member 20a of Figure 1 serves to control the adjustment of the contact member 40 shown in Figure 2. The shiftable member 26a of Figure 1 controls the opening and closing of the switch 26. Another switch handle 42, Figure 1, is employed to control the lighting equipment (not shown) within the casing 12 for illumination purposes in connection with the reflecting galvanometer.

The particular type of electrodes shown in Figures 1 and 2 are adapted to be applied conveniently to the patient's hands and feet. The electrode 28 which may be formed of copper, is gripped by the patient in the manner shown in Figure 1, and the plate 32, which may be formed of zinc, is large enough to receive the patient's feet. The shunt 20 is first adjusted by manipulating the member or handle 20a so as to give the desired constant in the galvanometer readings, and either the adjustable resistance 36 or amplifier 38 is connected in the circuit by means of the switch 34. Obviously the amplifier may be of any conventional design, and hence is merely diagrammatically represented in Figure 2. Such an amplifier is only employed when the current flow from the patient's body is so minute that, unless said current is amplified, the moving coil of the galvanometer will not respond. On the other hand, if it is desired to reduce the current flow, resistance 36 may be placed in the circuit, as clearly indicated in Figure 2, in which case the switch 34 would occupy a position to the left.

Furthermore, my invention is by no means limited to any particular type of electrodes, nor is it limited to the specific "feet to hands" arrangement hereinbefore described, but is capable of numerous other modifications and variations. In other words, various types of electrodes may be employed either in direct or through non-polarizing contact with the organism. Thus, in Figure 3, I have disclosed another modified type of electrode construction which may be employed. In this figure I have shown a head-band 44 which is designed to support an electrode 46. Another electrode 48 is adapted to be conveniently applied to any part of the body. By employing this arrangement, I am able to take a series of readings with the electrode 48 placed at various locations, and in this manner locate variations in electrical conductivity which bear relationship to pathologic conditions. Obviously electrodes may be employed, both of which are adapted to be positioned at any part of the body without departing from the present invention.

Furthermore it will be apparent that the term "dissimilar electrodes," as employed in the present specification and claims is used to cover, as is known in the art, any two substances which are differently spaced in the electromotive series regardless of their physical and chemical form. Moreover, the invention is intended to comprehend the contact of the said dissimilar electrodes with tissue of the body in any such manner as to result in the production of the aforesaid electrolytic action with the said tissue whether the contact of the electrodes is direct or indirect or combined with the use of some known material to inhibit or prevent polarization.

In performing my tests, I may apply the electrodes to the exterior portions of the body or in any of the body orifices in order to determine the electrical characteristics of the body at various locations. It is quite evident from experimental work performed by me that there are certain spots over the body which are much more sensitive than others, and from which greater currents are derived than from other parts which may be equally spaced. Further, my invention has a very practical application in locating or determining body lesions. When the exploring electrode is placed directly over a lesion, either deep seated or superficial, greater currents flow in the circuit, and in this manner I am able to locate lesions in the body.

According to my preferred method of procedure, for example, the device is preferably first calibrated or adjusted in the manner conventional for sensitive electrical devices by placing a standard cell across the electrodes with the switches 22 and 26 closed and the switch 34 to the left, as viewed in Figure 2. The reading given by the galvanometer is then noted and compared to that reading which is proper for the standard cell. Should there be a variation, the resistance 36 is adjusted until the reading of the galvanometer properly corresponds with the characteristics of the cell. Subsequently the cell is removed from the circuit and, using the electrodes shown in Figure 1 and with the switches closed as before, the patient stands barefooted on the zinc plate 32, holding the copper bar 28 firmly in his hands. It is, of course, the practice to carefully clean and dry the parts in contact with the electrodes. According to this arrangement the circuit is substantially entirely through the body and the resulting galvanometer reading is an indication of the electrolytic characteristics thereof as a whole and accordingly the general vitality of the body. It has been found that the current flowing in the circuit, as indicated by the galvanometer, is of substantially constant value for all normally healthy persons.

In order to examine the body locally for abnormal sites or lesions, electrodes, such as shown in Figure 3, are preferably employed and, after securing the electrode 46 against the forehead at a substantially constant pressure, the electrode 48 is used to explore the surface of the body. I prefer first to make a test by closing the switches as before and contacting the exploring electrode to some part of the body which appears to be free or most nearly free of disease, such as for example, the upper arm. With the reading given by the galvanometer as a basis for comparison, the electrode is then contacted to as many different parts of the body as are to be studied and the reading of the galvanometer noted during each contact. Of course, it is necessary to employ care in applying the movable electrode with substantially the same firm, flat pressure against the skin. In the vicinity of foci of infection or sites of disturbed cellular activity I have found that the readings vary from the normal in the manner defined above.

The currents normally involved in the present tests are quite readily measurable in the manner aforementioned and consequently an amplifier is not generally necessary. If, however, for experimental purposes, it is desired to measure highly amplified currents then, with the switches 22 and 26 closed as before, and the switch 34 is thrown to the right, as shown in Figure 2.

From the foregoing it will be clear that my invention contemplates the provision of means and methods, whereby electrolytic conditions of an organism such as the human body may be determined without the use of an external source of current supply. In fact, the only source of current supply is the body of the patient, and, while these currents are minute, they may be accurately measured by the use of suitable instruments, such as a sensitive current indicating device disclosed in the drawing. My invention should be clearly distinguished from devices, such as temperature detectors and the like which have been employed heretofore. My improved testing device is dependent for its functioning upon the current generated in the human body, and is not dependent for its functioning upon temperature gradient, etc. My invention contemplates the use of various forms of electrodes and current indicating instruments adapted to be connected in an open circuit of the type herein described. It will be apparent that I employ a very simple and economically arranged open galvanometer circuit. My device is extremely compact in construction and may be conveniently transported from place to place.

This application is a continuation in part of my prior application Serial No. 602,837, filed April 2, 1932, now abandoned. My British application corresponding to the above prior filed United States case, was allowed on June 4, 1935, as British Patent No. 429,595.

Obviously numerous modifications and changes in the circuit and structural features herein described may be made without departing from the spirit and scope of the invention set forth in the appended claims.

Having thus described my invention, what I claim as new and desire to secure by Letters Patent is:

1. The method of determining an electrolytic characteristic of a living animal organism which comprises providing a pair of dissimilar electrodes composed of materials differently situated in the electromotive series and which are characterized by the creation of a potential difference therebetween when contacted at spaced points with an electrolytic conductor, applying said electrodes at substantially constant pressure to the surface of a living animal organism and at spaced points thereon to create a non-pulsating direct current potential difference therebetween due to the electrolytic nature of the organism, and measuring the non-pulsating direct current potential or current generated between said dissimilar electrodes.

2. The method of determining the electrolytic condition of a living animal organism which comprises applying a pair of dissimilar electrodes at spaced points to the tissue surfaces of the organism in order to create a non-pulsating direct current potential difference between said electrodes due to the electrolytic nature of the organism, and measuring the non-pulsating direct current potential or current generated between said dissimilar electrodes.

3. The method of determining the electrolytic condition of a living animal organism which comprises applying a pair of dissimilar electrodes at spaced points to the tissue surfaces of the organism in order to create a non-pulsating direct current potential difference between said electrodes due to the electrolytic nature of the organism, and measuring the non-pulsating direct current potential or current generated between said dissimilar electrodes, moving at least one of the electrodes to a different point on the tissue surfaces of the animal organism, which point is spaced from said other electrode, and again measuring the non-pulsating direct current potential or current generated.

4. An apparatus for determining the pathological condition of a living animal body comprising a pair of electrodes of dissimilar materials, each of said electrodes being shaped to facilitate its application to the tissue surface of the body at spaced points, and electric circuit connections between said electrodes, said connections including means for measuring the non-pulsating current generated between the electrodes by the contact thereof with the tissue of the body.

5. An apparatus for determining the pathological condition of a living animal body comprising a pair of electrodes of dissimilar materials, at least one of the electrodes having an insulated supporting portion and an electrode contact face shaped to facilitate application to the surface of the tissue of the body, the electrodes being adapted to be pressed against the body surface under a substantially even pressure and with a substantially constant area of contact during application, and electric circuit connections between said electrodes, said connections including means for measuring the non-pulsating current generated between the electrodes by the contact thereof with the tissue of the body.

FRANCIS C. ELLIS.